US007292788B2

(12) United States Patent
Triebes et al.

(10) Patent No.: US 7,292,788 B2
(45) Date of Patent: Nov. 6, 2007

(54) MULTI-BEAM LASER COMMUNICATIONS SYSTEM AND METHOD

(75) Inventors: Kenneth J. Triebes, San Jose, CA (US); Michael Enoch, Placitas, NM (US); Larry H. Capots, Mountain View, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 949 days.

(21) Appl. No.: 10/356,359

(22) Filed: Jan. 31, 2003

(65) Prior Publication Data

US 2004/0151504 A1 Aug. 5, 2004

(51) Int. Cl.
*H04B 10/00* (2006.01)
(52) U.S. Cl. ............... 398/122; 398/121; 398/125; 398/123; 398/124; 398/130; 398/131; 398/129
(58) Field of Classification Search ........... 398/121, 398/122, 124, 125, 129, 131, 118
See application file for complete search history.

(56) References Cited

U.S. PATENT DOCUMENTS

| | | | | |
|---|---|---|---|---|
| 4,933,928 A * | 6/1990 | Grant et al. | ............... | 398/121 |
| 5,119,225 A * | 6/1992 | Grant et al. | ............... | 398/123 |
| 5,218,467 A * | 6/1993 | Ross et al. | ............... | 398/124 |
| 5,517,016 A * | 5/1996 | Lesh et al. | ............... | 250/201.1 |
| 5,592,320 A * | 1/1997 | Wissinger | ............... | 398/121 |
| 5,710,652 A * | 1/1998 | Bloom et al. | ............... | 398/129 |
| 6,347,001 B1 * | 2/2002 | Arnold et al. | ............... | 398/122 |
| 6,590,685 B1 * | 7/2003 | Mendenhall et al. | ............... | 398/121 |
| 6,768,876 B1 * | 7/2004 | Steiger et al. | ............... | 398/156 |
| 6,795,655 B1 * | 9/2004 | Sidorovich et al. | ............... | 398/128 |
| 6,839,519 B1 * | 1/2005 | Kleiner et al. | ............... | 398/121 |
| 7,058,307 B2 * | 6/2006 | Sakanaka | ............... | 398/119 |
| 2002/0080452 A1 * | 6/2002 | Sakanaka | ............... | 359/172 |
| 2002/0131121 A1 * | 9/2002 | Jeganathan et al. | ............... | 359/152 |
| 2002/0167697 A1 * | 11/2002 | Willebrand | ............... | 359/152 |
| 2002/0171896 A1 * | 11/2002 | Clark et al. | ............... | 359/172 |
| 2003/0215242 A1 * | 11/2003 | Oettinger et al. | ............... | 398/118 |
| 2004/0141754 A1 * | 7/2004 | Cheng et al. | ............... | 398/122 |

* cited by examiner

*Primary Examiner*—Kenneth Vanderpuye
*Assistant Examiner*—Thi Le
(74) *Attorney, Agent, or Firm*—McDermott Will & Emery LLP (57) ABSTRACT

A laser communications system includes a wide-field sensor, configured to detect a first set of laser communications sources within a first field of view, a narrow-field sensor includes a tracking portion and a control portion configured to receive laser communications from a second set of laser communications sources within a second field of view, wherein the first field of view is larger than the second field of view, and wherein the second set of laser communications sources comprises at least a first source and a second source, and a redirection unit coupled to the narrow-field sensor configured to position the second field of view within the first field of view wherein the first receiving element is positioned in response to the first positioning signal for the first receiving element, and the second receiving element is positioned in response to the first positioning signal for the second receiving element.

17 Claims, 11 Drawing Sheets

MULTI-BEAM LASER COMMUNICATIONS SYSTEM AND METHOD

BACKGROUND OF THE INVENTION

Communications via satellites, that forty years ago was novel, has now become common. Whether the communications are telephone calls, the latest video for the 10 O'clock news, or surfing the web, etc., the concept of sending a signal to a satellite, and having the satellite rebroadcast the signal is well established. Typical state of the art satellites broadcast signals in the range of 3-30 Gigahertz, with corresponding data rates of up to 20 Mbits/second.

Although this data rate may sound impressive at first, the inventors of the present invention have contemplated that in the future, a substantially higher data satellite rates will be required. For example, the inventors contemplate that satellite data rates in the order of Terahertz may be necessary.

One method contemplated by the inventors for increasing the data bandwidth is to increase the number of communications satellites. Drawbacks to this approach include that communications satellites are very expensive to manufacture and maintain over the lifespan. Another drawback is that the skies are getting crowded, thus the number of satellites that can be put into orbit is diminishing.

Another solution contemplated by the inventors to increase the bandwidth has been to use optical system and lasers for communications. In particular, the inventors have considered selected concepts explored in the non-related field of weapon systems for ideas. Some concepts include missile acquisition, pointing and tracking using transmit and receive optical systems. Some specific directed energy weapons programs include multi-target tracking such as Talon Gold, LODE, StarLab, ADAPT, and CF &TDP. Such programs devote a great quantity of hardware and software resources for acquisition of an incoming missile. However, for communications, such resources are not as important, because communications terminals deliberately signal their presence.

In light of the above, what is required are improved methods and apparatus for acquisition and tracking of multiple independently target laser communications devices. Further, what is required are methods and apparatus for providing such solutions in economical ways.

BRIEF SUMMARY OF THE INVENTION

According to one aspect of the present invention, acquisition and tracking of multiple independently targeted laser communications devices from a single optical system is provided. Additionally, rapid, large angle retargeting between laser communications channels between different theaters is provided.

In embodiments of the present invention include an optical system, a steering mirror, and an acquisition sensor integrated into a platform position in a geosynchronous for geostationary orbit. As will be discussed below, the optical system (a projector/receiver telescope) is configured to communicate with other laser communications devices or terminals based on the ground, in the air, or in space. The steering mirror is typically a full-aperture fast steering mirror configured to rapidly retarget the optical system to different communication theaters that are separated by large angles, i.e. larger than the static field of view of the optical system of approximately 20 mradians. The acquisition sensor is configured to have a field of view of approximately 20°, thus covering the earth and surrounding space.

In one embodiment of the present invention, multiple transmitter and receiver fibers are positioned in the focal plane of the optical system thus enabling multiple, independently targetable laser communications beams to be transmitted and received from the optical system. In one embodiment, each individual fiber is mounted on an actively controlled X-Y stage in the common focal plane, and the positions of each fiber is tracked. In one embodiment, to provide high-bandwidth fine tracking, each receiver channel also includes a quad cell integrated with the fiber tip to sense the "wings" of the received signal. The acquisition sensor in combination with the quad cell are used to acquire and maintain centration of the incoming laser signal on the fiber tip.

An embodiment of the present invention provides rapid retargeting between laser communications terminals separated by large angles in a short periods of time. As an example, rapid retargeting with current technology allows switching between two different laser communications channels separated by, for example, 10 degrees in <50 milliseconds with the performance limited by the fast steering mirror. To improve performance, non-inertial beam steering technology, such as an optical phased array, can accomplish the same retargeting function of the mirror in <1 milliseconds.

Another embodiment of the present invention provides projection of multiple independent laser communications beams through a single optical aperture. This embodiment may be used to communicate with multiple high altitude collector unmanned aerial vehicles (UAVs) deployed in a single theater of operations. In one embodiment, this single optical system can uplink high bandwidth data from nine or more collector UAVs simultaneously in addition to supporting simultaneous independent downlinks on all channels.

According to one aspect of the invention, a laser communications system includes a wide-field sensor, configured to detect a first set of laser communications sources within a first field of view, and a narrow-field sensor configured to receive laser communications from a second set of laser communications sources within a second field of view, wherein the first field of view is larger than the second field of view, and wherein the second set of laser communications sources comprises at least a first source and a second source. Additionally, the system includes a redirection unit coupled to the narrow-field sensor configured to position the second field of view within the first field of view. In various configurations, the narrow-field sensor includes a receiving portion configured to receive laser communications from the first source and the second source, wherein the receiving portion includes at least a first receiving element and a second receiving element, a tracking portion including a tracking sensor configured to the receiving portion, configured to determine a first location on the tracking sensor in response to the laser communications of the first source, and configured to determine a second location on the tracking sensor in response to the laser communications of the second source, and a control portion coupled to the receiving portion and to the tracking portion, configured to determine a first positioning signal for the first receiving element in response to the first location, and configured to determine a first positioning signal for the second receiving element in response to the second location. In the present system, the first receiving element is configured to be positioned in response to the first positioning signal for the first receiving element, and the second receiving element is configured to be positioned in response to the first positioning signal for the second receiving element.

According to another aspect of the invention, a method for operating a communications system includes receiving a first communications signal from a first source in a first sensor having a first field of view, determining first positioning data in response to a position of the first communications signal within the first field of view, and positioning an input into a second sensor in response to the first positioning data, the second sensor having a second field of view and a second resolution, wherein the first field of view is greater than the second field of view, wherein the second resolution is greater than the first resolution, and wherein the second sensor includes at least a first receiving element, a second receiving element, and a tracking array. The method may also include receiving in the first receiving element of the second sensor, the first communications signal, receiving in the tracking array in the second sensor a second communications signal from a second source, determining second positioning data in response to a position of the second communications signal on the tracking array, and positioning the second receiving element of the second sensor in response to the second positioning data to configure the second receiving element to receive the second communications signal.

According to yet another aspect of the invention, a method for a communications platform is described. One method may include receiving a first laser communications from a first laser communications terminal in an optical telescope, wherein the optical telescope includes a plurality of transmitting elements, a plurality of receiving elements, and a tracking sensor, wherein the first laser communications is received by a first receiving element, and the first laser communications strikes the tracking sensor at a first position, and sending a first laser transmission to the first laser communications terminal from the optical telescope, wherein the first laser transmission is sent by a first transmitting element, and the first laser transmission strikes the tracking sensor at a second position. Additionally, the steps of monitoring a third position on the tracking sensor where the first laser communications subsequently strikes the tracking sensor, adjusting a position for the first transmitting element in response to the third position on the tracking sensor, wherein the first laser transmission subsequently strikes the tracking sensor in a fourth position; and sending the first laser transmission to the first laser communications terminal may also be performed. In one embodiment, an offset between the first position and the second position on the tracking sensor is substantially similar to an offset between the third position and the fourth position on the tracking sensor.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1A:
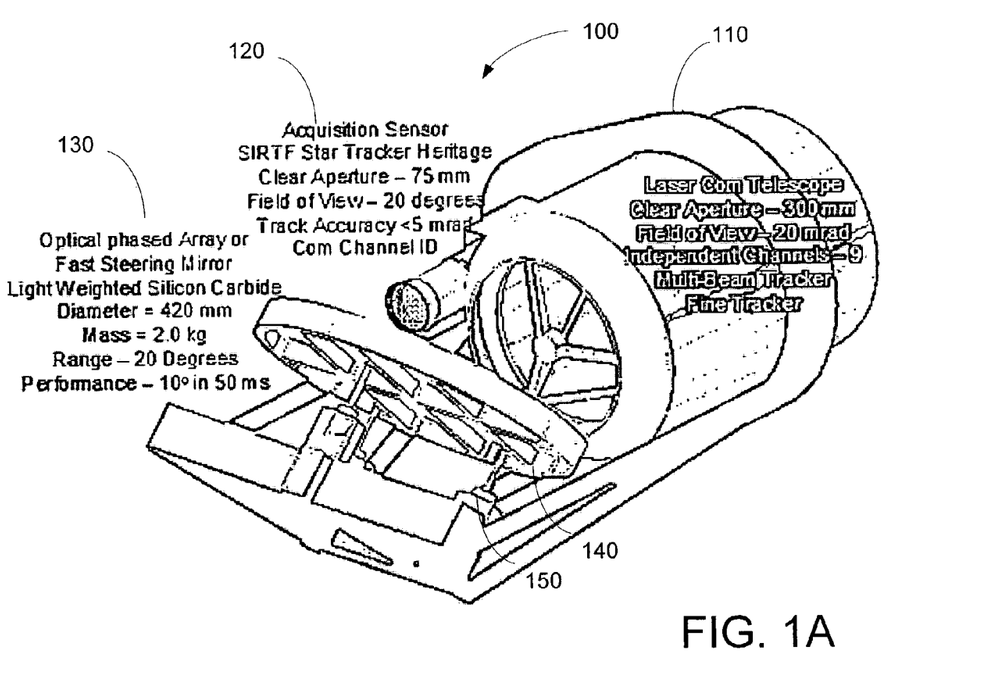
FIGS. 1A and B illustrate an embodiment of the present invention.
Figure 1B:
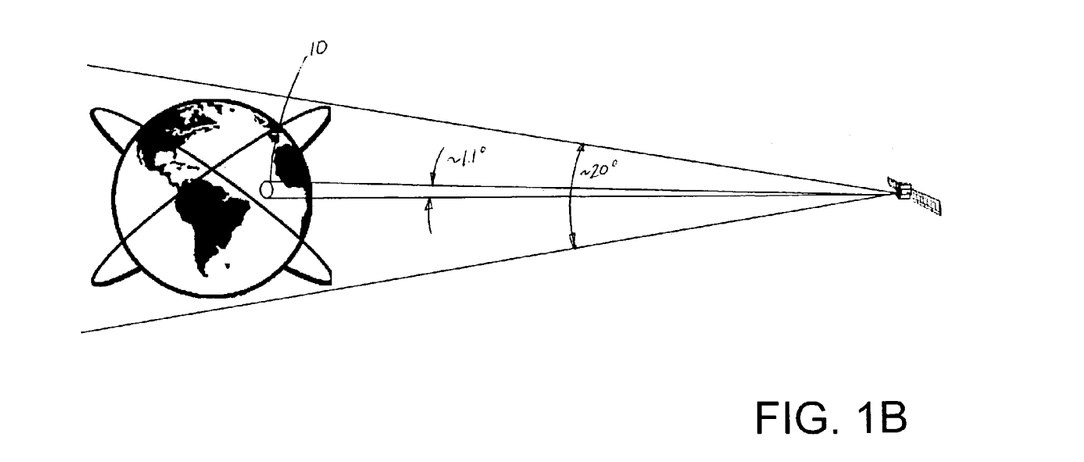

FIGS. 1A and B illustrate an embodiment of the present invention. In particular, FIG. 1A illustrates three portions of a laser communications platform 100. Platform 100 includes an optical system (a laser communications projector/receiver telescope) PRT 110, an acquisition tracker system (AT) 120, and a fast steering mirror (FSM). FIG. 1B illustrates a field of view of an embodiment of the present invention.

In embodiments of the present invention, platform 100 will be a space based communications platform located in geostationary or geosynchronous (GEO) orbit around the earth at an altitude of approximately 35,800 km. In other embodiments, platform 100 may have different orbits, fields of view, specifications, and the like.

As illustrated in FIG. 1B, in one embodiment of the present invention AT 120 is a laser communications tracking system with a field of view of approximately 20°. In other embodiments of the present invention, the field of view is greater than approximately 17.4° so that the entire earth can be viewed by AT 120 without repositioning platform 100. In the embodiments where the field of view of AT 120 is greater than approximately 17.4°, AT 120 can not only view the entire earth, but also space surrounding the earth.

In one embodiment, AT 120 is capable of detecting, receiving, and tracking laser communications devices for terminals that are land based, air based, space based, and the like. For example, land based devices may include laser communications from buildings, mobile vehicles, portable devices, and the like; air based communication devices may include laser communications from reconnaissance aircraft, airborne platforms, low altitude and high altitude unmanned aerial vehicles (UAVs), and the like; and satellite based communications devices may include laser communications from satellites in low earth orbit (LEO), medium earth orbit (MEO), Geosynchronous earth orbit (GEO), or other space based source.

In one embodiment, AT 120 comprises a device with a 75 mm aperture. In other embodiments, other sized apertures may be used depending upon specific requirement. For example, a larger aperture may be used to increase the resolution of AT 120. Embodiments of AT 120 may be derived from star tracking technologies. For example AT 120 may be derived from the star tracking portion of the Space Infrared Telescope Facility (SIRTF) scheduled to be launched in January 2003. In one embodiment of the present invention, AT 120 includes a sensor that gives AT 120, a resolution that enables it to identify laser communications with an accuracy of approximately <5.0 microradians, or approximately 180 to 200 meters on the ground. In other embodiments, AT 120 may have a different resolution, for example higher or lower.

In one embodiment of the present invention, AT 120 may include low bit-rate laser transmission, i.e. the additional ability to transmit laser communications back to a detected laser communications device. Such capabilities would allow AT 120 to communicate and authenticate potential laser communications devices or terminals, before FSM 130 and PRT 110 are retargeted, as will be described below.

Referring back to FIG. 1A, in the present embodiment FSM 130 comprises a mirror 140 controlled by an actuation system 150. In present embodiment, mirror 140 is configured to cover the fields of view of both AT 120 and PRT 110. In order to rapidly repoint or slew PRT 110 to different channels or "theaters" that are separated by large angles, AT 120 is configured as a large dynamic range sensor that can accurately determine an orientation or a steering angle for mirror 130. In this embodiment, AT 120 measures the difference in centroid locations between the current communications channel (theater) and the next theater. Based upon the difference, a steering angle for mirror 130 is determined, and applied. PRT 110 is thus pointed to the next theater within the field of view of AT 120.

Mirror 140 and actuation systems 150 may be of a conventional design suitable for a space platform. In one embodiment, actuation system 150 may be configured as responsive motors that are configured to quickly retarget mirror 140 with respect to PRT 110. In future systems, FSM 130 may include an optical phased array or other non-inertial beam steering technology. Such advances are believed to decrease the retargeting time by approximately two orders of magnitude between different theaters.

In this embodiment, PRT 110 comprises an optical telescope having a 300 mm clear aperture. This may be embodied as an a focal three-mirror anastigmat configuration, although other configurations may be used in light of the present disclosure. As illustrated, in FIG. 1B, in this embodiment, the field of view of PRT 110 is approximately 20 milliradians (≈1.1 degrees), with a field of view that covers a circle 10 of approximately 720 kilometers in diameter at the earth's surface. In other embodiments, the field of view may be larger of smaller depending upon specific requirements.

Within the field of view, PRT 110 is configured to receive simultaneous communications from multiple laser communications devices, such as UAVs, or the like. Further, within the field of view, PRT 110 is also configured to transmit simultaneous independent laser communications to multiple laser communications devices. Such communications are typically high bandwidth devices.

Figure 2:
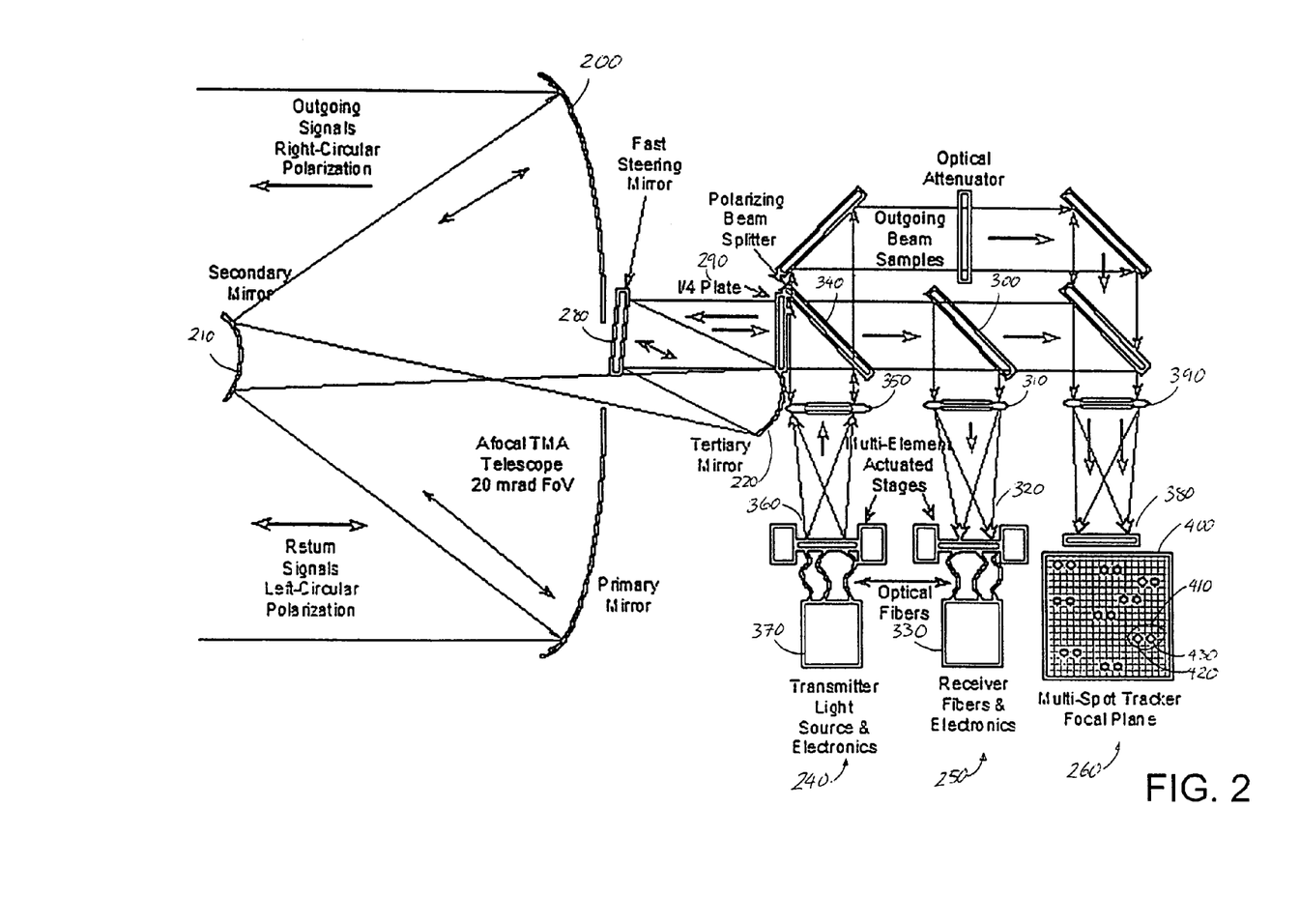
FIG. 2 illustrates a schematic of an embodiment of the present invention.

FIG. 2 illustrates a schematic of an embodiment of the present invention. In particular, FIG. 2 illustrates an embodiment of PRT 110. As illustrated, PRT 110 may be embodied in a three-mirrored design, 200, 210, and 220. PRT 110 also includes a transmitter subsystem 240, a receiver subsystem 250, and a tracker subsystem 260.

In this embodiment, an additional steering mirror 280 is located in the pupil plane of PRT 110, to actively stabilize and vibrationally induced jitter from platform 100. For example, in embodiments where platform 110 is a satellite, such jitter may be induced by electronics, object strikes, propellants, or the like.

As shown in this embodiment, subsequent to stabilization mirror (SM) 280, a quarter wave plate 290 is provided. In one embodiment of the present invention, laser communications received are left-circularly polarized, and laser communications transmitted are right-circularly polarized. As is known, quarter wave plate 290 converts linearly polarized light into circularly polarized light, and circularly polarized light into linearly polarized light. Thus, incoming laser communications are converted to an up-down polarization, for example, by quarter wave plate 290. The outgoing laser communications are output in an orthogonal polarization, for example, side-to-side, and then converted by quarter wave plate 290 to the right-circular polarization.

In this embodiment, receiving subsystem 250 includes a polarizing beam splitter 300, optics 310, multiple receiving elements 320, and laser communications receivers 330. Transmitting subsystem 240 includes a polarizing beam splitter 340, optics 350, multiple transmitting elements 360, and laser communications transmitters 370.

In this embodiment, polarizing beam splitter 300 is configured to reflect linearly polarized light from the received laser signals to optics 310. Similarly, polarizing beam splitter 340 is configured to reflect linearly polarized light from optics 310 to quarter wave plate 290. In this embodiment, polarizations of beam splitter 300 and 340 are orthogonal to reduce potential cross-talk, i.e. laser transmissions from transmitting subsystem 240 from being received by receiving subsystem 250. As shown in FIG. 2, beam splitter 300 allows a portion of the received laser signals to be transmitted to tracker subsystem 260, and beam splitter 340 allows a portion of the transmitted laser signal to be transmitted to tracker subsystem 260. Such beam splitters may be of conventional design. These elements are common to many laser optical systems and are designed to improve the optical efficiency by 4×.

In the present embodiment, received laser transmissions are focused using optics 310 onto the plane where multiple receiving elements 320 are located. As will be discussed further below, in one embodiment, multiple receiving elements 320 includes nine repositionable laser communications receivers within the focus plane. These receivers are typically coupled via optical fibers to laser communications receivers 330.

In embodiments of the present invention, laser communications receivers 330 may be coupled to laser communications transmitters 370 optically or electrical. In other words, the received laser communications signals may be converted into electrical signals, amplified, and/or processed (encoded/decoded) and back into laser signals for transmission, in one embodiment. In another embodiment, all optical or partial optical components may be used such as optical amplifiers, optical switches, optical filters and the like may be used.

In this embodiment, laser communications transmitters 370 output laser signals via optical fibers to multiple transmitting elements 360. As will be illustrated below, multiple transmitting elements 360 also includes nine repositionable elements that are typically located at the focus plane of optics 350. The transmission signals are linearly polarized by beam splitter 340, and then right-circularly polarized by quarter wave plate 290 for transmission.

In the present embodiment, leakage of transmitter laser signals through beam splitter 340 is directed to a focal plane 380 of optics 390. Further, a small portion of a received laser signal (about 1%) passes through beam splitter 300 and is also directed to focal plane 380. As illustrated in FIG. 2, a multi-spot tracker 400 is positioned at focal plane 380. In this embodiment, tracker 400 includes an array of radiation-sensitive elements. For example, in one embodiment, the array is an array of charge-coupled devices that are sensitive to laser light, (for example 1.55 micron wavelength light). In one embodiment, the array is fabricated from a silicon substrate an InGaAs substrate, or the like. The resolution of tracker 400 may vary according to requirements, for example, in one embodiment, tracker includes an array of 256×256 cells, in other embodiments, the array includes approximately 1K×1K cells, and in still other embodiments, the array may include greater than 2K×2K cells. In other embodiments, other types of detection elements are envisioned.

As illustrated in FIG. 2, a number of "pairs" of spots are illustrated, such as pair 410. In this embodiment, the laser transmissions from transmitting subsystem 240 is projected onto tracker 400 as the left spot 420 of pair 410. Further, the received laser communications is projected onto tracker 400 as the right spot 430 of spot pair 410. In this embodiment, a static angular or lateral offset is induced between the spots to allow for accurate centroid tracking of both the laser communications and laser transmissions. In some embodiments, for all laser terminals, the same lateral offset is induced between the spot pairs, whereas in other embodiments, for different laser terminals, different offsets between the spots in a spot pair may be used. The present embodiment uses centroid tracking, or other similar techniques. This enables tracker 400 and PRT 110 to have an accuracy of less than 500 nrad.

In embodiments, the laser communications terminal may move a relative to platform 100 between sending and receiving communications. For example, the laser communications terminal may be another satellite. In such embodiments, it is contemplated that the spot pairs will have a larger offset or displacement because the transmitted laser signal will have to point "ahead" to account for the relative motion of the laser terminal to platform 100.

FIGS. 3A-D illustrate an embodiment of the present invention. In particular FIGS. 3A-D illustrate embodiments of multiple receiving elements 320 and/or multiple transmitting elements 360.

Figure 3A:
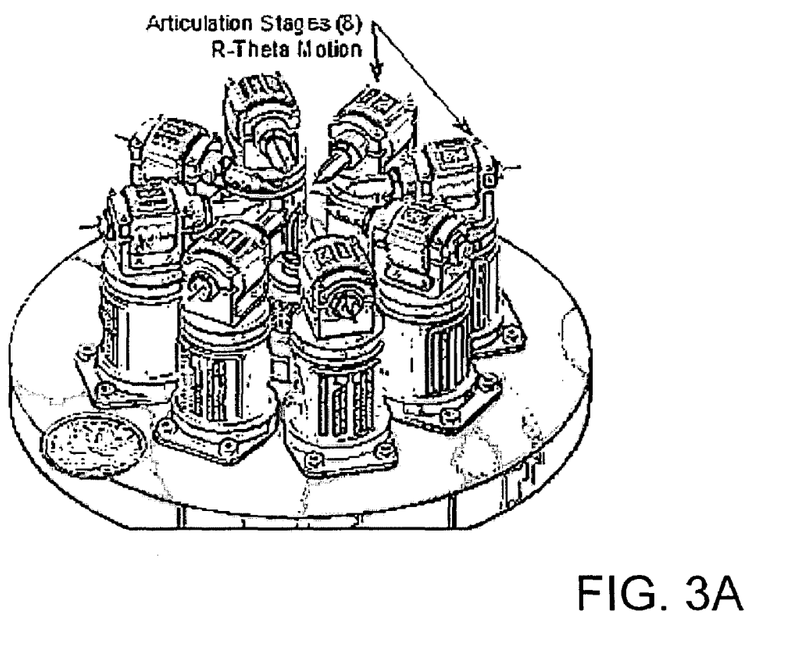
FIGS. 3A-D illustrate an embodiment of the present invention.

The embodiment illustrated in FIG. 3A, is an isometric view of articulated elements located in the respective focal planes. In this example, the transmitter and receiver fibers are positioned within individual actuators that can be articulated in at least two degrees of freedom. In this example, each articulation system provides both radial (r) and angular motion (theta) to cover the field of view assigned to that individual fiber channel. In this embodiment, the actuators have a fiber positioning accuracy of <0.5 microns which is large compared to commercially available actuators that are capable of <0.005 micron precision. In other embodiments, other types of actuators can be used. For example, in other embodiments, additional degrees of freedom can be used, and a greater or lesser number of actuators can be used.

Figure 3B:
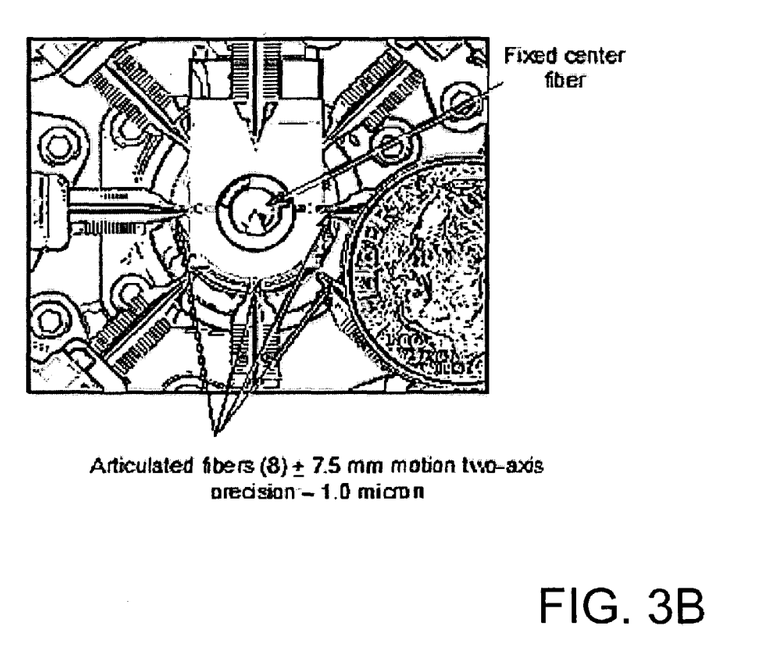

FIG. 3B illustrates a more detailed view of the articulated elements in this embodiment. As illustrated, in this embodiment, nine actuators are provided, thus providing support for up to nine laser communications devices. In this embodiment, the center fiber in each array is fixed in position and the surrounding eight elements are articulated. In other embodiments, the number of independent fiber channels is arbitrary and can be adjusted in a final design to meet mission-derived requirements.

Figure 3C:
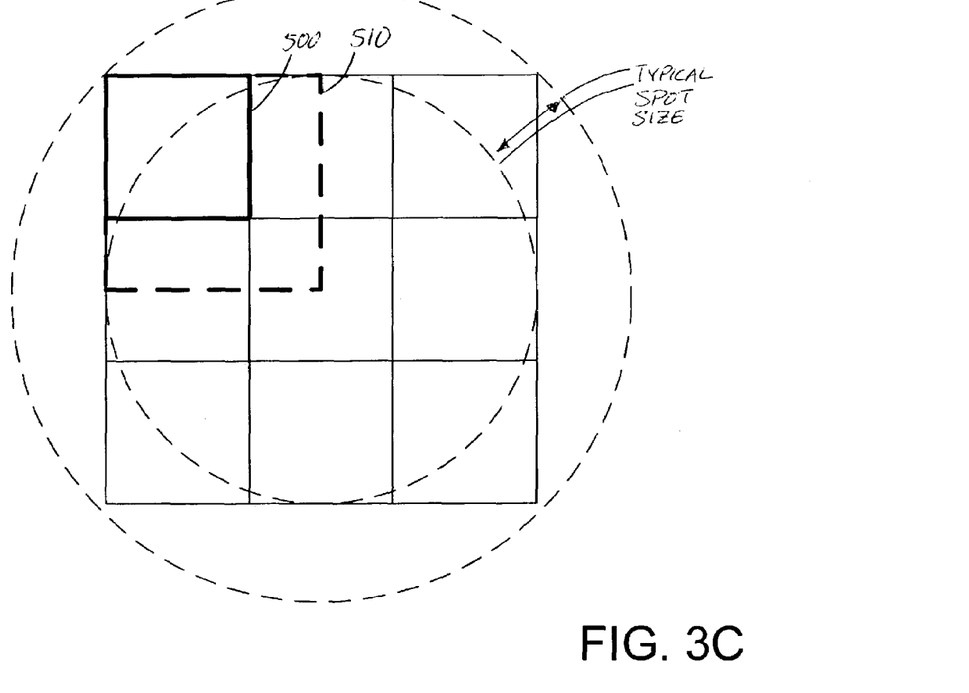

FIG. 3C illustrates a diagram illustrating the range of motion for the non-fixed actuators in this embodiment. As illustrated, a tip is assigned a primary coverage area 500. However, in this embodiment, the articulated tip can also be positioned into a neighboring coverage area 510 as shown, to cover up to half the coverage area. The other articulated tips may also have a similar primary coverage area and extended coverage area.

Because of the physical sizes of the actuator tips, the actuator tips cannot be positioned closer than a certain distance from each other. In practical terms, this limits how close two adjacent laser transmission devices can be located on the ground. For example, in the present embodiment, this translates to a suggested minimum distance of >12 kilometers between laser communications terminals on the ground. In the future, this distance may be made smaller depending upon the embodiment, for example, by using different actuator configuration, by using different transmission wavelengths, and the like, the suggested minimum distance may be reduced.

Figure 3D:
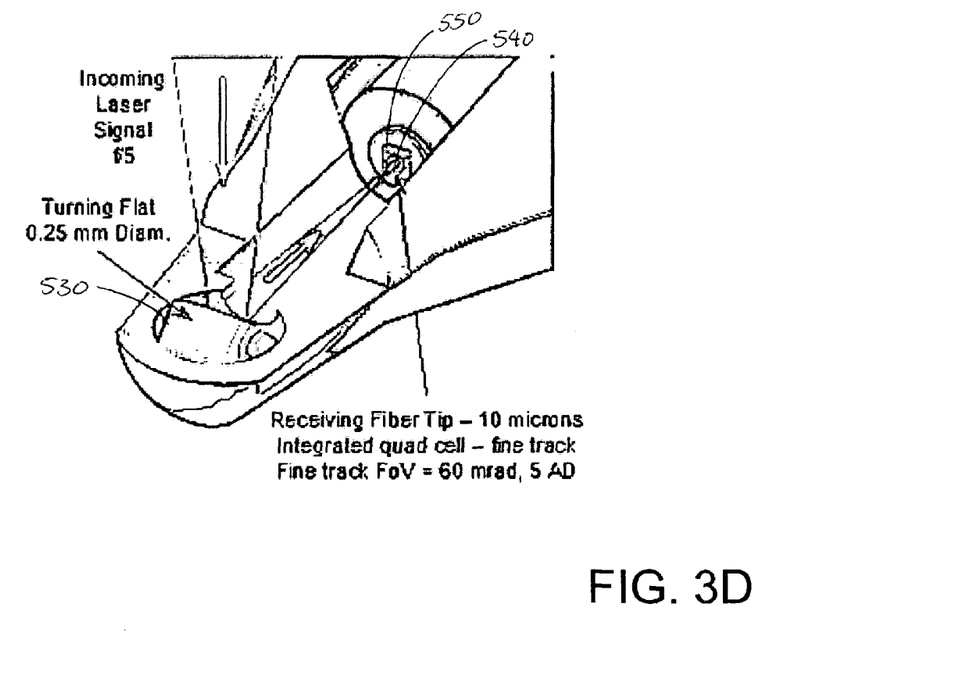

FIG. 3D illustrates a detailed diagram of a receiver actuator tip according to one embodiment. For the sake of robustness, the individual optical fibers are integrated with the lead screw of each radial actuator. In this embodiment, a small (0.25 mm) turning flat 530 align the optical fiber 540 with the optic axis of the telescope, as shown. Additionally, as will be described further below, to facilitate both closed loop fine tracking and rapid retargeting through large angles, a fine positioning sensors, such as a quad cell 550, is provided with the tip of each of the receiver fibers. In other embodiment, a different number of cells may be used.

The fine positioning sensors are typically 1.0 mm in size, but may vary with other embodiments. In this embodiment, the size of the devices gives the elements a fine tracking field of view of greater than 650 microrads. This large fine field of view significantly reduces the tracking accuracy requirement on AT 120 and open-loop slewing accuracy of fast steering mirror 130 during rapid retargeting operations.

Figure 4A:
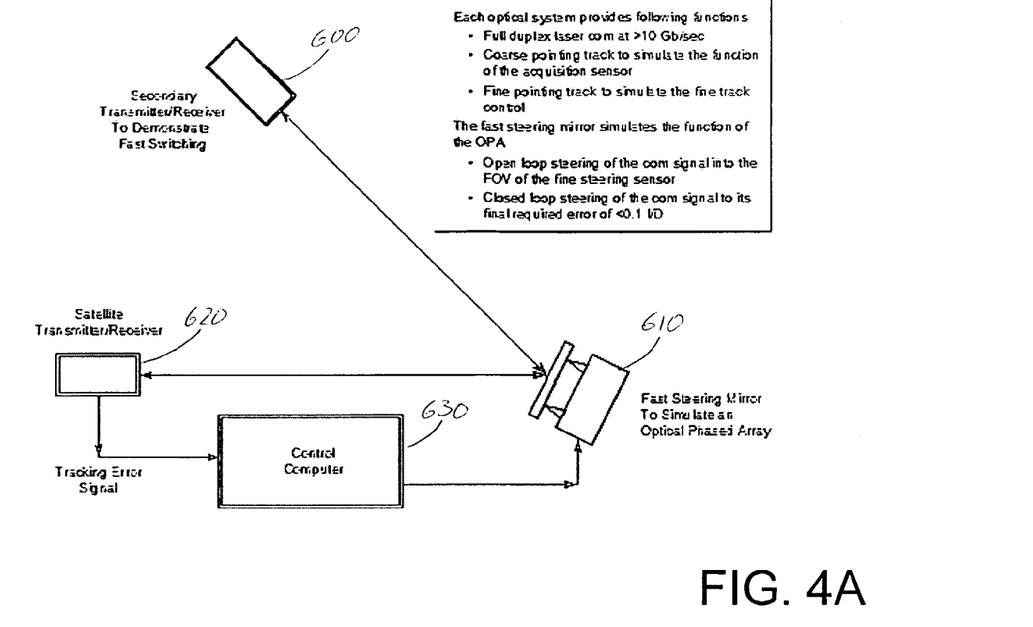
FIGS. 4A-C illustrate another embodiment of the present invention.
Figure 4B:
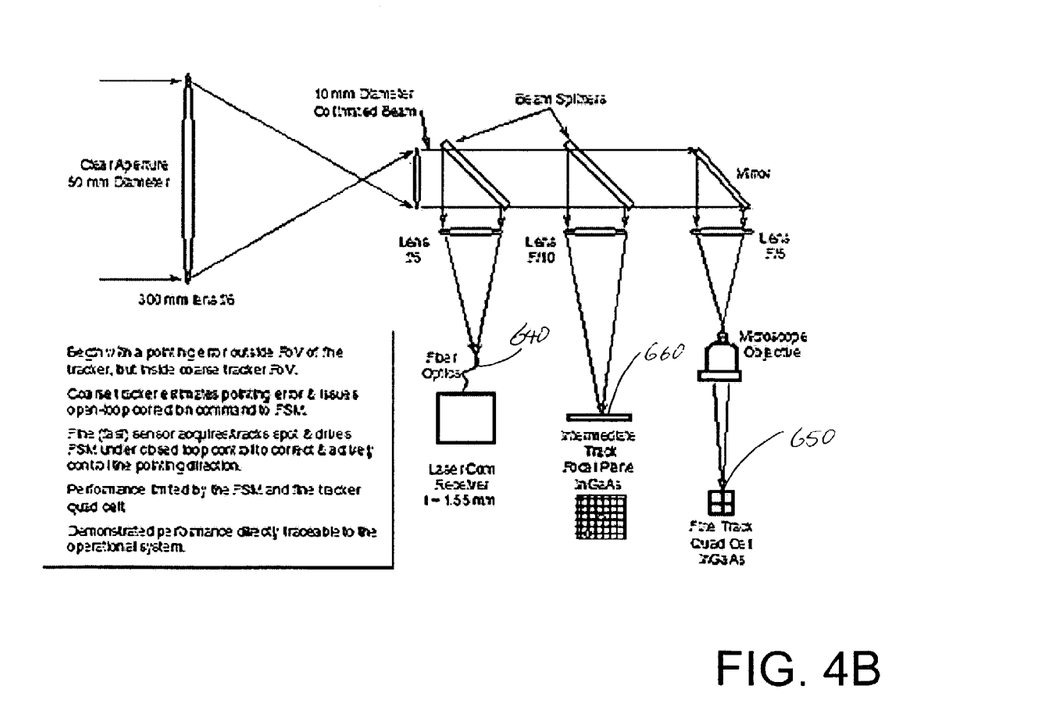
Figure 4C:
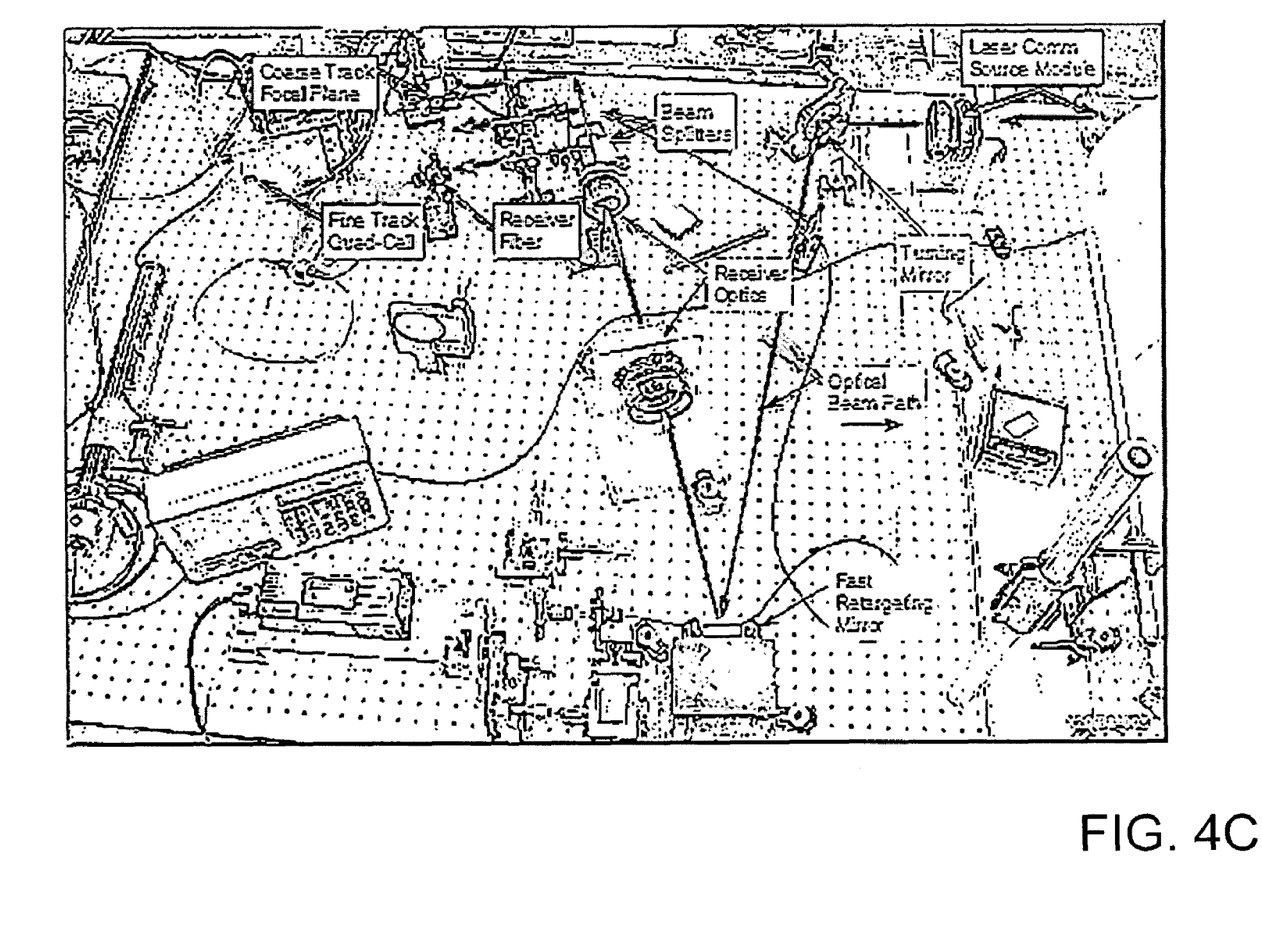

FIGS. 4A-C illustrate another embodiment of the present invention. In particular, FIGS. 4A-C illustrate an operational test system.

One embodiment of the present invention can be implemented using conventional technology. FIG. 4A illustrates one such embodiment. As shown, this embodiment includes a transmitter 600, a fast steering mirror 610, a receiver 620, and control logic 630. As will be discussed below, control logic 630 is used for open loop control of fast steering mirror 610. In an embodiment, control logic 630 may be embodied in conventional ways, such as dedicated hardware (ASIC), general purpose computing hardware (Intel or AMD microprocessor, DSP) with software programs, or the like.

FIG. 4B illustrates another schematic of an embodiment. In particular, FIG. 4B illustrates a detailed diagram of receiver 620. As shown, receiver 620 includes a fiber optic channel 640, a fine track quad cell 650, and a intermediate/acquisition track 660. The embodiment illustrated in FIG. 4B implements the operational functions of fast large-angle retargeting, active fine tracking of the received signal and active pointing control of the outgoing beam.

FIG. 4C illustrates an implementation of the embodiments discussed in FIGS. 4A-B. In this embodiment, the embodiment was initially assembled using available visible lasers and detectors to facilitate initial alignment and functional demonstrations. However, this embodiment is easily reconfigured for configurations at more typical laser communications wavelengths, such as 1.55 microns.

Figure 5A:
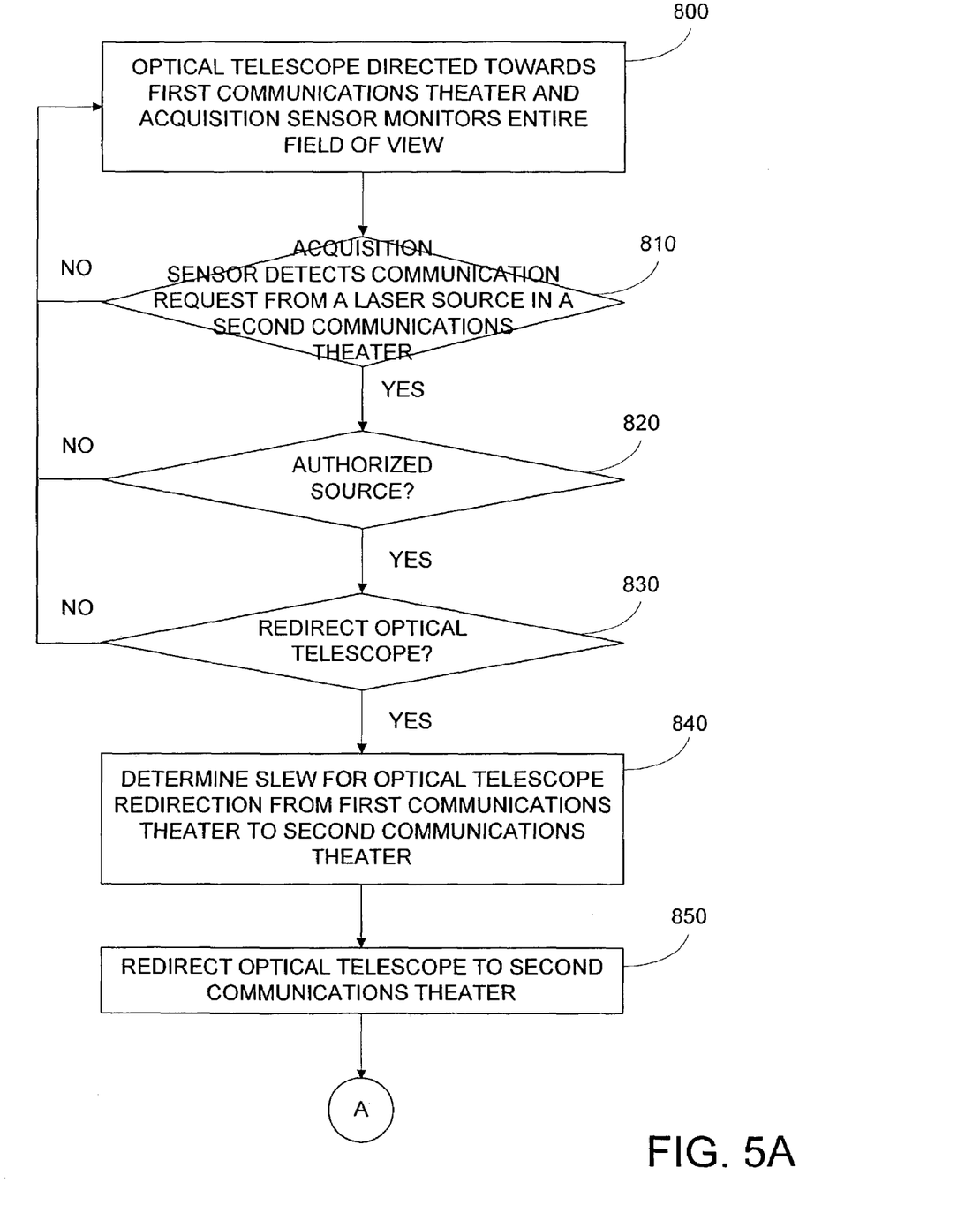
FIGS. 5A-B illustrate a representation of a flow diagram according to an embodiment of the present invention.
Figure 5B:
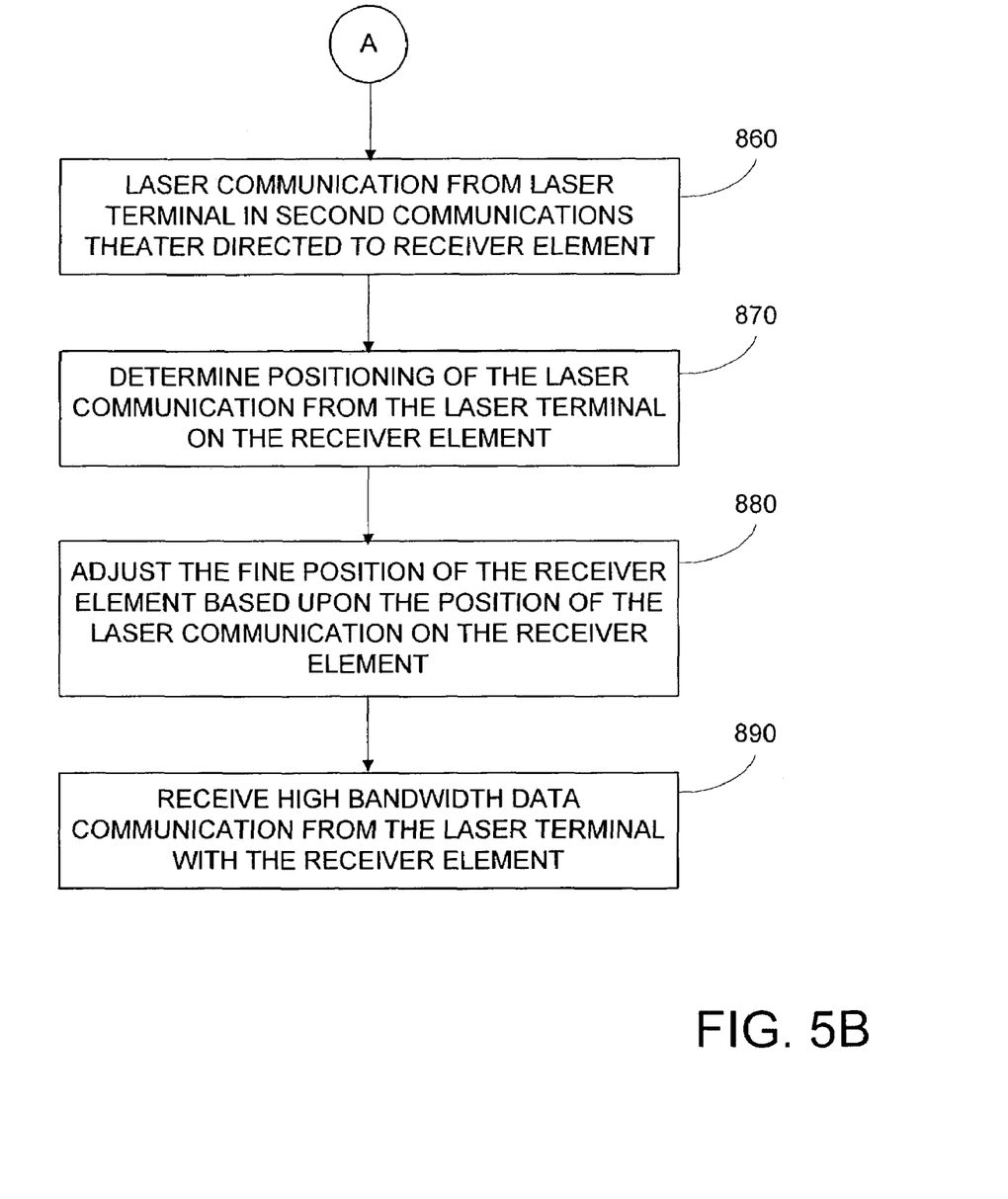

FIGS. 5A-B illustrate a representation of a flow diagram according to an embodiment of the present invention.

Initially, steering mirror 130 is positioned such that PRT 110 is pointing to a first communications theater, step 800. As mentioned above, while PRT 110 points to a first theater, AT 120 monitors the entire field of view of platform 100.

In one embodiment of the present invention, AT 120 may receive a laser transmission from a laser terminal outside the first theater, in a second theater, step 810. In response to the received transmission, AT 120 may use low bandwidth communications with the laser terminal to authenticate or positively identify the laser terminal, step 820. This step may be implemented to prevent spoofing, i.e. random laser signals designed to confuse platform 100.

After authentication, platform 100 may determine that PRT 110 should be pointed to the second theater, step 830. For example, although the requesting laser terminal is authentic, PRT 110 may be in the middle of laser communications with another laser terminal.

In other embodiment of the present invention, platform 100 may be given specific instructions for PRT 110 to be switched to a second theater at a specific time, i.e. without AT 120 receiving a laser transmission. This is useful for scheduled transmission windows.

In the present embodiment, a slew angle for steering mirror 130 is then determined, step 840. The slew angle is typically the parameters used by the steering portion in steering mirror 130 so that steering mirror 130 points to the appropriate channel (theater). In this embodiment, the slew angle is easily calculated because the current orientation of steering mirror 130 is known, and the angular distance and orientation between the first theater and second theater is known.

To initiate the channel switch, the steering portion in is given an open-loop command to optically steer to the next theater, which it then does as fast as possible, step 850. The control logic 630 may be used for this operation. In the present embodiment, this open-loop steering action is accomplished with sufficient accuracy to place the received laser communications, if any, within the capture range of fine track quad cells located on the receiver fiber, step 860. In the present embodiment, the quad cell field of view is >650 microrad, which is well within the accuracy of the open loop steering command.

In one embodiment of the present invention, the received laser communications may be directed to the central "fixed" receiver element, discussed above. In other embodiments, the received laser communications may be directed to a receiver element other than the central element. In such a case, the slew angle may also be determined based upon a current position of the desired receiving element.

Next, once the received communications has been focused upon the receiver quad cell, a high-bandwidth closed loop control system, such as control computer 630, determines the position of the communications on the quad cell, step 870, and drives the fine pointing of the steering portion to center the spot on the fiber and close the communications channel, step 880. Any conventional control algorithm may be used for both the open loop steering and closed loop steering processes. Once locked-on the second laser communications terminal, PRT 110 may initiate high-bandwidth communications, step 890. In another embodiment of the present invention, steps 860-880 may be periodically reexecuted to ensure proper alignment of the laser communications onto the fiber.

Figure 6:
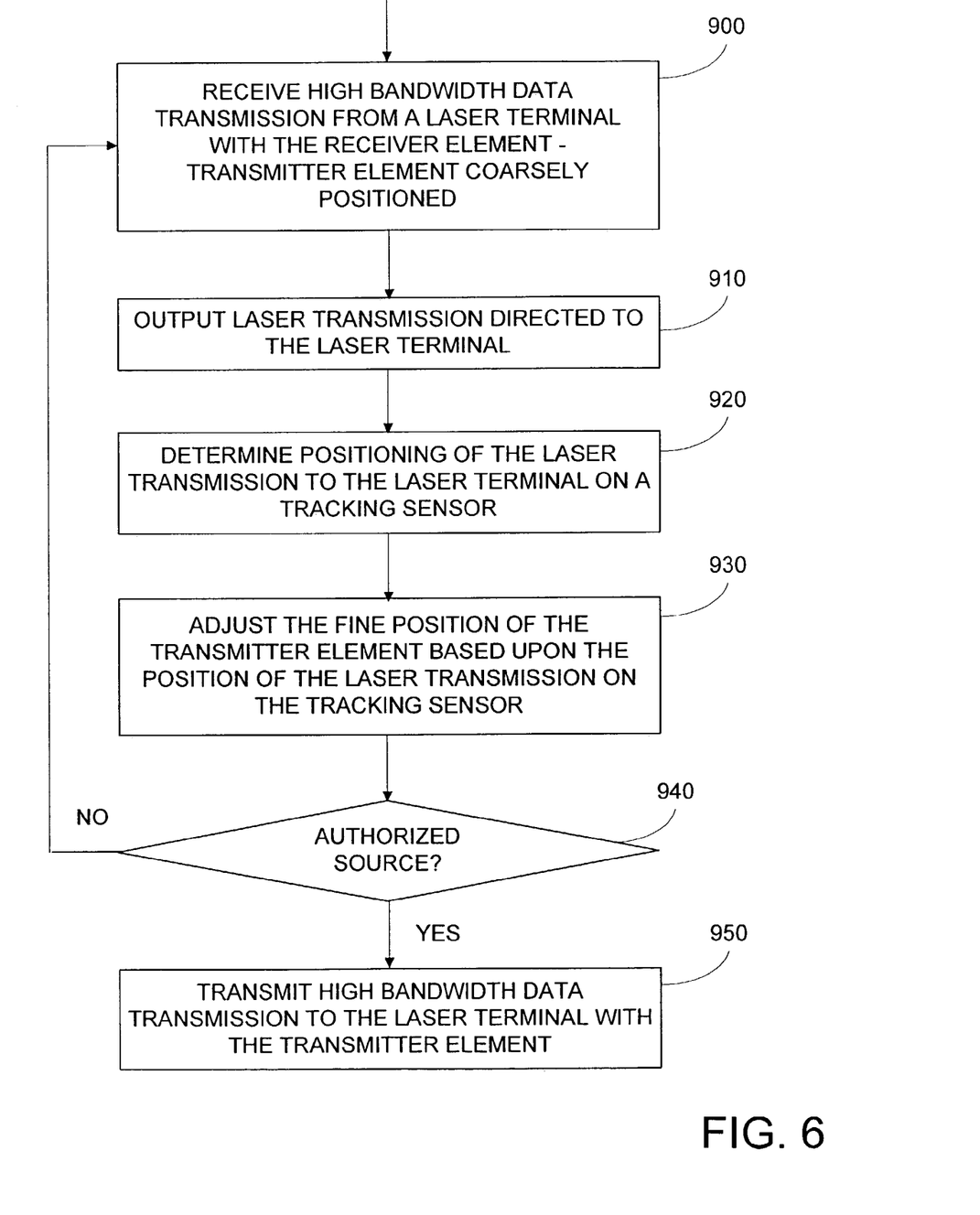
FIG. 6 illustrates a representation of another flow diagram according to an embodiment of the present invention.

FIG. 6 illustrates a representation of another flow diagram according to an embodiment of the present invention. In particular, FIG. 6 illustrates the process of transmitting data back to a laser terminal.

As was illustrated in FIG. 2, the received signal is represented a dot on tracker 400. Once the receiver position is established, step 900, the transmitter fiber stages are activated to orient a transmitting element to direct signals back to the laser terminal. That is, one of the transmitting elements 360 are positioned such that it can output laser transmissions back to the laser terminal In this embodiment, this is accomplished by transmitting a laser signal from an available transmitting element, step 910. This transmitted laser signal will also appear as a dot on tracker 400, step 920. Based upon the relative position of the received dot and the transmitted dot on tracker 400, the transmitting element is directed to be repositioned, step 930. This process may be repeated, until the received dot and transmitted dot are positioned with the same fixed offset, discussed above. For example, the process may repeat until they appear as a pair of dots on tracker 400.

As mentioned above, in some embodiments, to compensate for motion of the laser terminal with regards to platform 100, the output transmission may have a point-ahead amount. That is, as opposed to having pairs of dots (e.g. 410) of a fixed offset, as above, an additional offset may be added to account for the relative motion. Accordingly, for such laser terminals, the dots may appear with different separations on tracker 400.

In the above embodiment a centroid calculation may be made to determine the locations of the dots on tracker 400. In other embodiments, other types of calculations may also be used.

In the present embodiment, the receiver elements are positioned by feedback from the integrated quad cells, to an accuracy of <0.001 Airy disks. The transmitter fibers are also driven by the centroids of the tracked spots on tracker 400 to an accuracy of 0.005 Airy disks. In this embodiment, the pointing requirements only require a fiber positioning accuracy of <0.05 Airy disks.

In this embodiment, the laser signal may be authenticated, step 940, before high-bandwidth transmissions is initiated, step 950. For example, in some cases, a laser terminal will only be granted upload ability and may have restricted privileges to receive laser transmissions from platform 100.

Figure 7A:
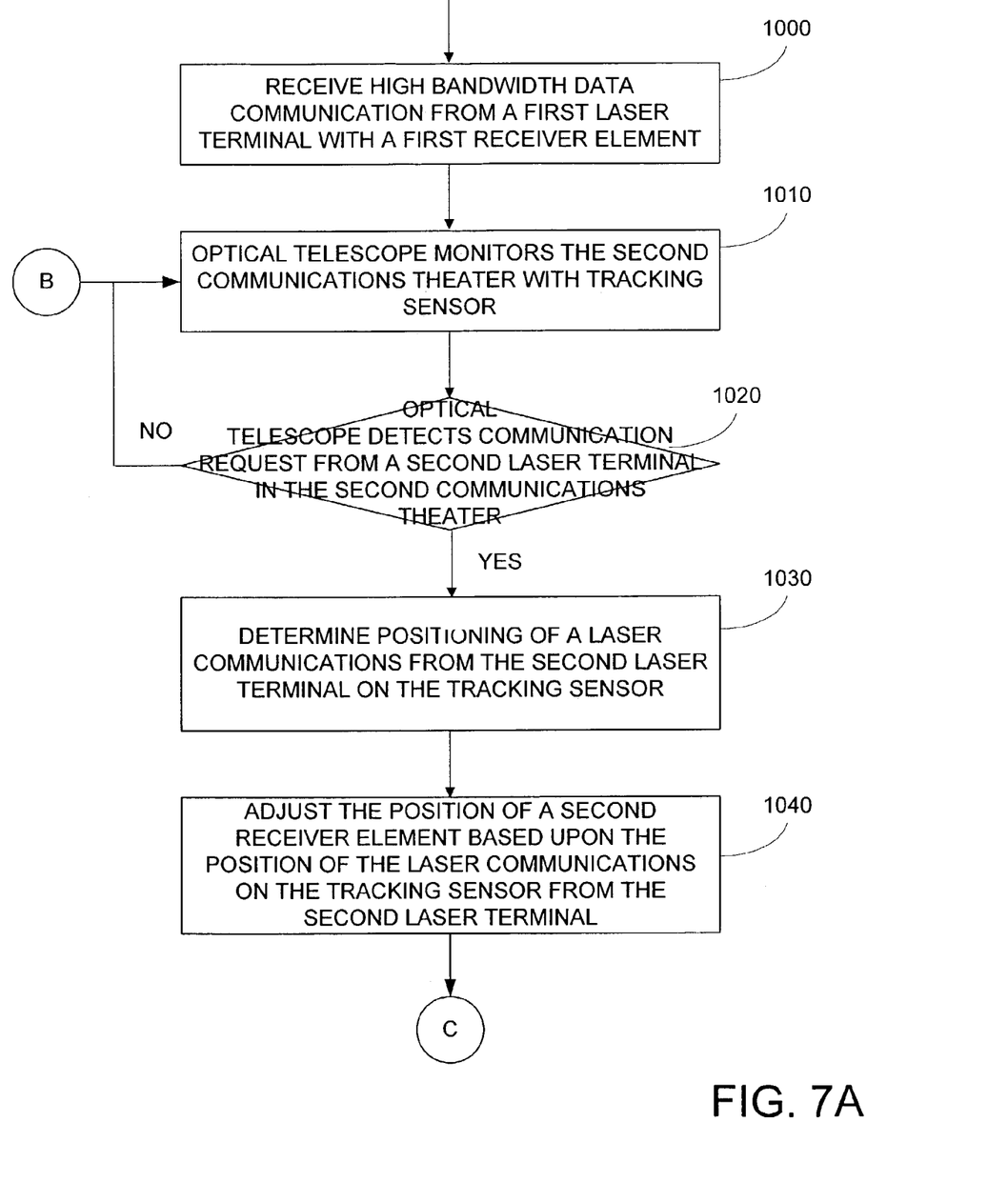
FIGS. 7A-B illustrate a representation of another flow diagram according to an embodiment of the present invention.
Figure 7B:
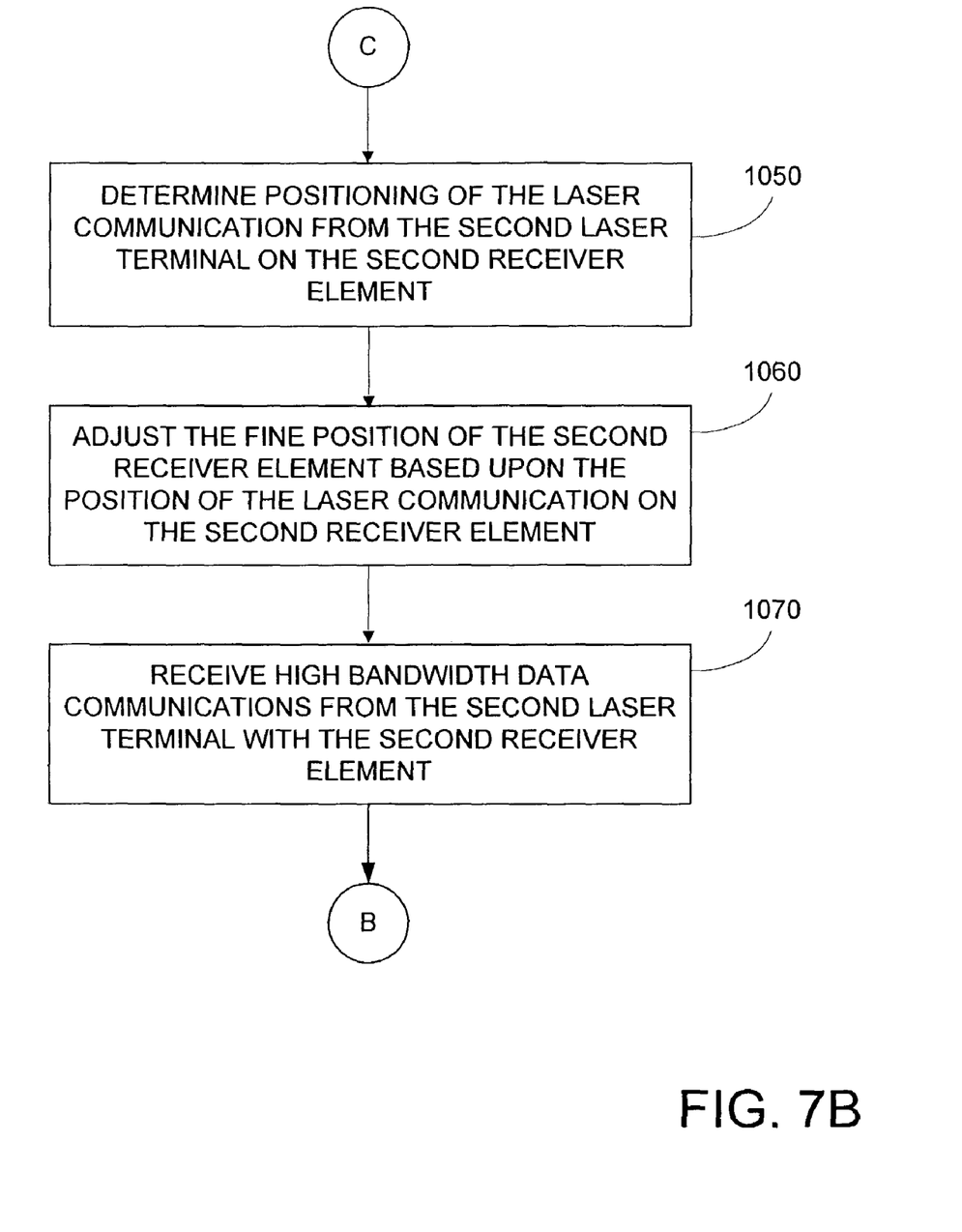

FIGS. 7A-B illustrate a representation of another flow diagram according to an embodiment of the present invention. In particular, this diagram illustrates how PRT 110 may communicate with multiple terminals within a theater.

In this embodiment, steering mirror 130 is locked into one theater, and PRT 110 conducts high-bandwidth communications with at least one communications terminals within this theater, step 1000. At the same time PRT 110 monitors tracker 400 to determine if there are any laser communications, step 1010. For example, multiple high-altitude collector UAVs who are each collecting data from numerous, low altitude surveillance UAVs may be operating within this theater. As discussed above, in this embodiment, the field of view of PRT 110 is approximately 20 mrad and it provides coverage over approximately a 720 km diameter area at the ground.

In this embodiment, while PRT 110 is communicating with a first laser terminal in the theater, a new laser terminal may initiate laser communications, step 1020. This new laser communication would typically appear as a new spot on tracker 400. In particular, a position of the new received laser spot on tracker 400 provides the initial tracking data for a receiver element, step 1030.

Based upon the position of the spot on tracker 400, a position for a receiver element is determined, for example, using control computer 630. Next, one receiver elements 320 is moved to the determined position such that the received laser communications is input into an optical fiber and transmitted to receiving subsystem 250, step 1040. The laser communications strikes the quad cells of the receiver element, step 1050 and this data is then used to-control the fine position of the optical fiber to optimize the signal strength of the received laser communications, step 1060. In one embodiment, a centroid calculation is performed, and in other embodiments, other types of calculations can be performed. Again, in the present embodiment, conventional feedback algorithms and hardware may be used to determine the fine positioning amount for the receiver element.

In view of the above disclosure, many other variations can be envisioned. For example, wave division multiplexing WDM may be used. For example, using WDM, more than one wavelength of laser communications may be received and transmitted for each receiving and transmitting element. Such embodiments would greatly increase the number of simultaneous communications, and greatly increase the data rate of platform 100. In still other embodiments, DWDM techniques may also be used.

In the present embodiment, the quad cell referred to above may be fabricated using InGaAs or other high speed substrate. Using such components, it is believed that the quad cell would be able to achieve sensing rates in excess of 100 KHz. Accordingly, steps 1050-1070 can be repeated at a high rate to increase the likelihood that the laser communications will be centered upon the receiving fiber.

In other embodiments, non-inertial steering portion such as a spatial light modulator or optical phased array can be used instead of a physical steering mirror. Using such an array, redirection from one theater to another theater is expected to be done in less than 1.0 milliseconds compared to the <50 milliseconds of a physical mirror. As the technology of the non-inertial steering systems matures, one of these devices can be substituted for the fast steering mirror with no other changes to the basic system design.

The above embodiments include an equal number of transmitting elements as receiving element, however in other embodiments, the number of transmitting elements and receiving elements may be different. For example, in some embodiments, the number of receiving elements may be greater than the number of transmitting elements. Such embodiments may be useful for collection of laser communications from multiple assets with transmissions to a limited number of command and control units.

In other embodiments of the present invention, combinations or sub-combinations of the above-disclosed invention can be advantageously made. The block diagrams of the architecture and flowcharts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A laser communications system comprises:
   a wide-field sensor, configured to detect a first set of laser communications sources within a first field of view;
   a narrow-field sensor configured to receive laser communications from a second set of laser communications sources within a second field of view, wherein the first field of view is larger than the second field of view, and wherein the second set of laser communications sources comprises at least a first source and a second source; and
   a redirection unit coupled to the narrow-field sensor configured to position the second field of view within the first field of view;
   wherein the narrow-field sensor comprises:
   a receiving portion configured to receive laser communications from the first source and the second source, wherein the receiving portion includes at least a first receiving element and a second receiving element;
   a tracking portion including a tracking sensor configured to the receiving portion, configured to determine a first location on the tracking sensor in response to the laser communications of the first source, and configured to determine a second location on the tracking sensor in response to the laser communications of the second source;
   a control portion coupled to the receiving portion and to the tracking portion, configured to determine a first positioning signal for the first receiving element in response to the first location, and configured to determine a first positioning signal for the second receiving element in response to the second location;
   wherein the first receiving element is configured to be positioned in response to the first positioning signal for the first receiving element;
   wherein the second receiving element is configured to be positioned in response to the first positioning signal for the second receiving element; and
   wherein the narrow-field sensor further comprises a transmitting portion coupled to the tracking portion, wherein the tracking portion includes at least a first transmitting element and a second transmitting element, and wherein the tracking portion is configured to transmit laser communications to the first source and to the second source;
   wherein the tracking portion is also configured to determine a third location on the tracking sensor in response to the laser communications transmitted to the first source, and configured to determine a fourth location on the tracking sensor in response to the laser communications transmitted to the second source;
   wherein the control portion is also configured to determine a first positioning signal for the first transmitting element in response to the third location, and configured to determine a first positioning signal for the second transmitting element in response to the fourth location;
   wherein the first transmitting element is configured to be positioned in response to the first positioning signal for the first transmitting element; and
   wherein the second transmitting element is configured to be positioned in response to the first positioning signal for the second transmitting element.

2. The system of claim 1 wherein the tracking sensor comprises multiple sensing elements.

3. The system of claim 2 wherein the receiving portion comprises at least nine receiving elements configured within a common plane.

4. The system of claim 1
   wherein the first receiving element further comprises:
   an optical receiver configured to receive laser communications from the first source; and
   a fine tracking portion including a fine tracking sensor configured to determine a location on the fine tracking sensor where the laser communications of the first source strikes the fine tracking sensor;
   wherein the control portion is also configured to determine a second positioning signal for the first receiving element in response to the location on the fine tracking sensor; and
   wherein the first receiving element is also configured to be positioned in response to second positioning signal for the first receiving element.

5. The system of claim 4 wherein the fine tracking portion determines the location in response to a centroid calculation.

6. The system of claim 1 wherein the redirection unit comprises a unit selected from the group: fast steering mirror, optical phased array.

7. A method for operating a communications system comprises:
- receiving a first communications signal from a first source in a first sensor having a first field of view and a first resolution;
- determining first positioning data in response to a position of the first communications signal within the first field of view;
- positioning an input into a second sensor in response to the first positioning data, the second sensor having a second field of view and a second resolution, wherein the first field of view is greater than the second field of view, wherein the second resolution is greater than the first resolution, and wherein the second sensor includes at least a first receiving element, a second receiving element, and a tracking array;
- receiving in the first receiving element of the second sensor, the first communications signal;
- receiving in the tracking array in the second sensor a second communications signal from a second source;
- determining second positioning data in response to a position of the second communications signal on the tracking array;
- positioning the second receiving element of the second sensor in response to the second positioning data to configure the second receiving element to receive the second communications signal;
- receiving in the second receiving element of the second sensor, the second communications signal, the second receiving element having a third field of view;
- determining third positioning data in response to a position of the second communications signal within the third field of view; and
- repositioning the second receiving element of the second sensor in response to the third positioning data.

8. The method of claim 7
- wherein the second sensor includes at least a first transmitting element and a second transmitting element;
- the method further comprising:
- transmitting positioning signals from the first transmitting element;
- determining fourth positioning data in response to a position of the positioning signals on the tracking array; and
- positioning the first transmitting element of the second sensor in response to the fourth positioning data to configure the first transmitting element to transmit data to the first source.

9. The method of claim 8 further comprising:
- transmitting positioning signals from the second transmitting element;
- determining fifth positioning data in response to a position of the positioning signals on the tracking array; and
- positioning the second transmitting element of the second sensor in response to the fifth positioning data to configure the second transmitting element to transmit data to the second source.

10. The method of claim 9
- wherein after positioning the first transmitting element, the method includes transmitting first transmission signals from the first transmitting element in response to the first communications signal;
- wherein the first transmission signals are positioned at a position on the tracking array; and
- wherein the position of the first communications signal on the tracking array and the position of the first transmission signal on the tracking array are offset by a first spatial amount.

11. The method of claim 10
- wherein after positioning the second transmitting element, the method includes transmitting second transmission signals from the second transmitting element in response to the second communications signal;
- wherein the second transmission signals are positioned at a position on the tracking array;
- wherein the position of the second communications signal on the tracking array and the position of the second transmission signal on the tracking array are offset by a second spatial amount; and
- wherein the first spatial amount and the second spatial amount are approximately the same.

12. The method of claim 10
- wherein after positioning the second transmitting element, the method includes transmitting second transmission signals from the second transmitting element in response to the second communications signal;
- wherein the second transmission signals are positioned at a position on the tracking array;
- wherein the position of the second communications signal on the tracking array and the position of the second transmission signal on the tracking array are offset by a second spatial amount; and
- wherein the first spatial amount and the second spatial amount are dissimilar.

13. A method for a communications platform comprises:
- receiving a first laser communications from a first laser communications terminal in an optical telescope, wherein the optical telescope includes a plurality of transmitting elements, a plurality of receiving elements, and a tracking sensor, wherein the first laser communications is received by a first receiving element, and the first laser communications strikes the tracking sensor at a first position;
- sending a first laser transmission to the first laser communications terminal from the optical telescope, wherein the first laser transmission is sent by a first transmitting element, and the first laser transmission strikes the tracking sensor at a second position;
- monitoring a third position on the tracking sensor where the first laser communications subsequently strikes the tracking sensor;
- adjusting a position for the first transmitting element in response to the third position on the tracking sensor, wherein the first laser transmission subsequently strikes the tracking sensor in a fourth position; and
- sending the first laser transmission to the first laser communications terminal;
- wherein an offset between the first position and the second position on the tracking sensor is substantially similar to an offset between the third position and the fourth position on the tracking sensor, and
- wherein the first receiving element comprises a sensor and an optical receiver, the method further comprising:
- monitoring positions on the sensor where the first laser communications strikes the sensor over time; and
- repositioning the first receiving element over time in response to the positions.

14. The method of claim 13 wherein the tracking sensor comprises an array of sensors.

15. The method of claim 14 wherein the first laser communications bit rate is higher than approximately 20 Gbits/second.

16. The method of claim 13 wherein the sensor comprises a sensor comprising a substrate comprising InGaAs.

17. The method of claim 13 wherein the first laser communications from the first laser communications terminal comprises wave division multiplexed signals.

* * * * *